Oct. 20, 1942.  J. S. CONANT  2,299,682
APPARATUS AND METHOD FOR TAKING AND PROJECTING PICTURES
Filed Oct. 20, 1939  2 Sheets-Sheet 1
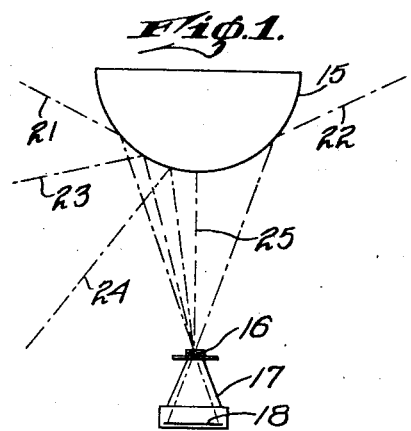
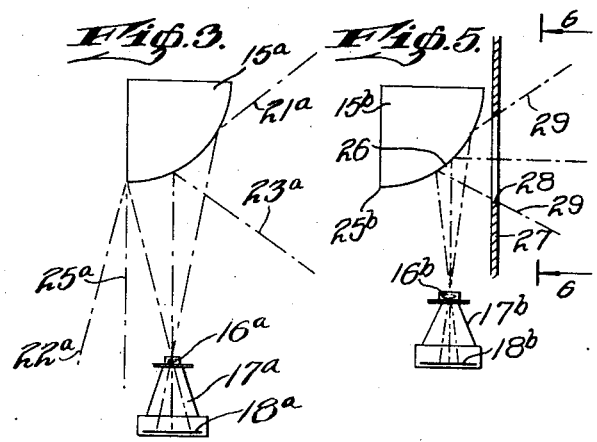
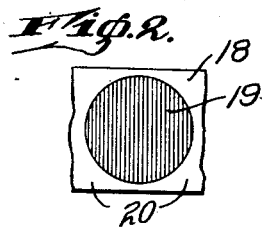
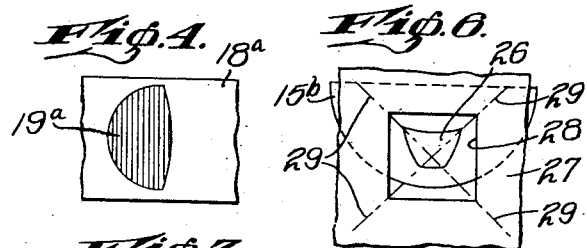
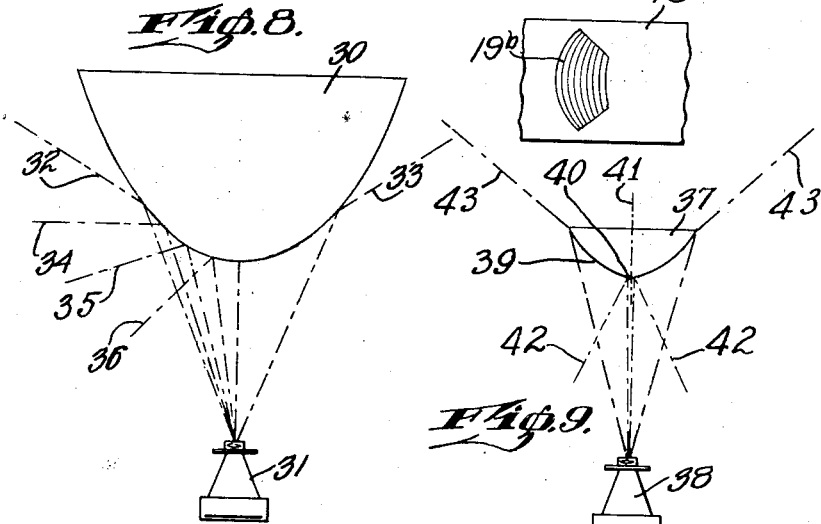
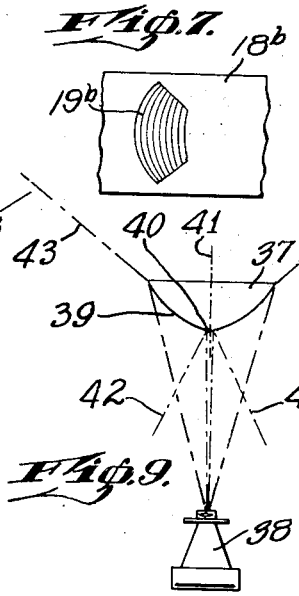
INVENTOR
JAMES S. CONANT
BY
ATTORNEY Oct. 20, 1942. J. S. CONANT 2,299,682
APPARATUS AND METHOD FOR TAKING AND PROJECTING PICTURES
Filed Oct. 20, 1939 2 Sheets-Sheet 2
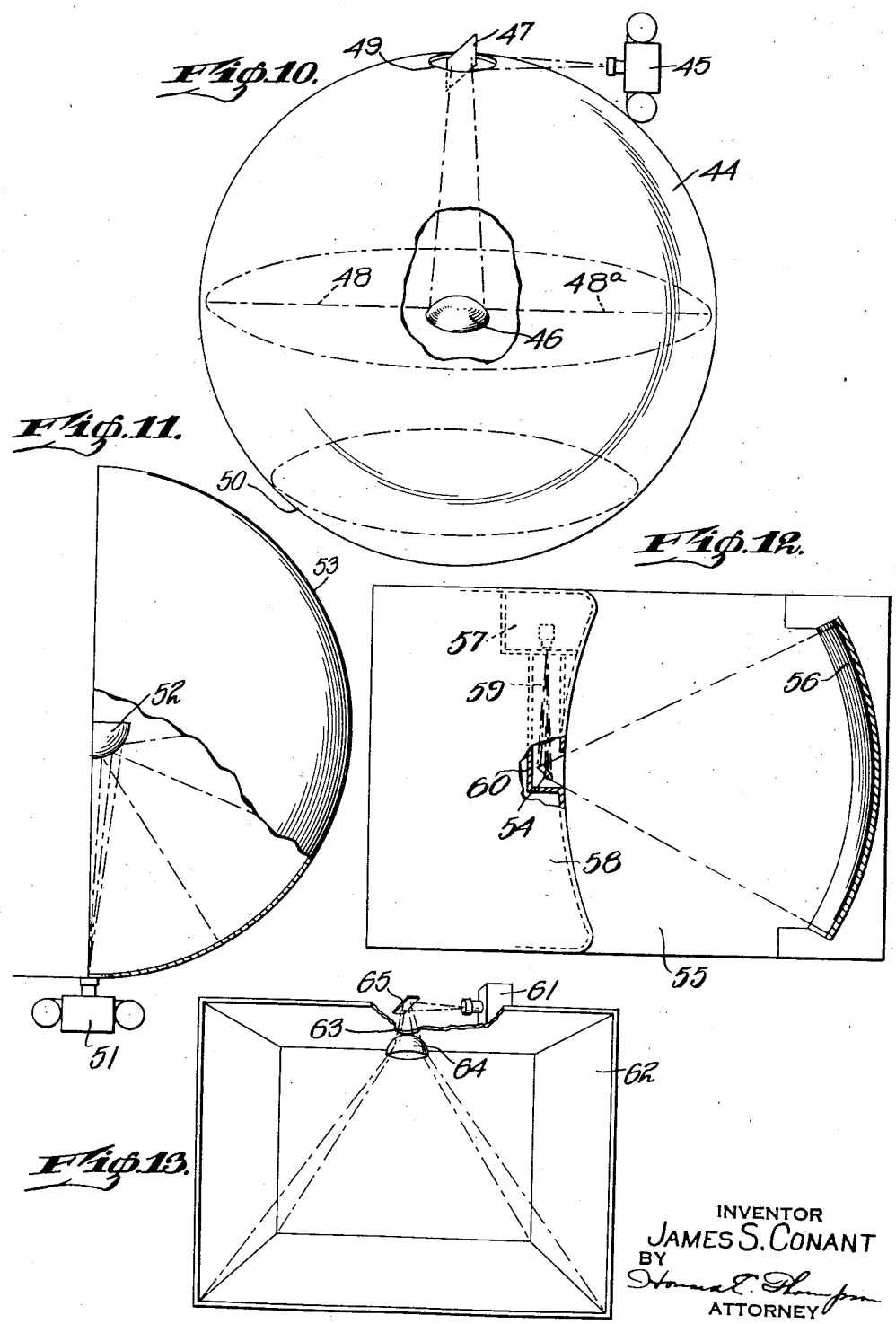
INVENTOR
JAMES S. CONANT
BY
ATTORNEY Patented Oct. 20, 1942

2,299,682

UNITED STATES PATENT OFFICE 2,299,682

APPARATUS AND METHOD FOR TAKING AND PROJECTING PICTURES

James S. Conant, Holtsville, N. Y.

Application October 20, 1939, Serial No. 300,288

9 Claims. (Cl. 88—24)

This invention relates to an apparatus for and method of recording and projecting photographic images to produce novel and interesting effects and particularly to create an effect of environment by means of a projected image, and the object of the invention is to provide a method for producing the effect described by first taking a picture of the desired surroundings through a special optical arrangement of light deflecting media adapted to produce in the resulting picture a distorted image of the surroundings and subsequently projecting the recorded image through the same or a structurally similar arrangement of light deflecting media to produce on a screen of predetermined shape and contour a projected image wherein the various objects of the surroundings photographed possess a true undistorted relation with one another; more specifically the object of the invention is to provide a method of producing the effect described by photographing the virtual image of a convexly curved reflecting surface thereby producing in the resulting photograph a distorted image and subsequently projecting said image through the same or a similarly curved reflecting surface onto a screen of predetermined shape and contour, and with these and other objects in view the invention consists in an apparatus and method which are more fully hereinafter described and claimed and diagrammatically illustrated in the accompanying drawings.

The invention is fully disclosed in the following specification, of which the accompanying drawings form a part, in which the separate parts of my improvement are designated by suitable reference characters in each of the views, and in which:

Fig. 1 is a diagrammatic illustration of a means for photographing the virtual image in a hemispherically curved reflecting surface.

Fig. 2 is a diagrammatic illustration indicating the contour of the image recorded through the reflector shown in Fig. 1.

Fig. 3 is a view similar to Fig. 1 indicating one method of photographing an image reflected from part a hemispherical surface.

Fig. 4 is a diagrammatic illustration indicating the contour of the image recorded through the reflector shown in Fig. 3.

Fig. 5 is a view similar to Figs. 1 and 3 indicating one means for photographing a reflected image from a portion of a curved surface.

Fig. 6 is a view substantially on the line 6—6 of Fig. 5.

Fig. 7 is a diagrammatic illustration indicating the contour of the image recorded from the reflecting surface shown in Figs. 5 and 6.

Fig. 8 is a view similar to Fig. 1 indicating a reflecting surface of substantially parabolic contour.

Fig. 9 is another view similar to Fig. 1 indicating a special reflector having a predetermined curved surface.

Fig. 10 is a diagrammatic view indicating one method of projecting the recorded image onto a substantially spherical screen.

Fig. 11 is a diagrammatic view indicating one method of projecting recorded images onto a substantially hemispherical screen.

Fig. 12 is a diagrammatic illustration of one method of projection within a room or theatre, and Fig. 13 is a diagrammatic view of one method of projection for the purpose of room illumination.

It is the normal practice in the taking and projecting of pictures, such for example as slides or moving pictures, to directly record a real image on a photographic plate and after suitable development to directly project this image onto a flat screen. This method of recording and projecting images, however, produces upon the screen a picture of limited scope which to the viewer is quite cold and distant. It is a primary purpose of my invention to provide for the recording and projecting of images in a manner to substantially reproduce an environment; or in other words to create an environmental effect in the projected image which tends to draw the viewer into the picture and make him feel himself to be part of the surroundings projected.

This method involves basically the recording of a photographic image including a wide angle of the surroundings through the use of a light deflecting medium, such for example as a convex reflector thereby producing a greatly distorted image on the photographic plate. This image is then projected through the same or structurally similar deflecting medium onto a predetermined screen. The screen may be of the same or similar contour as the surroundings photographed. On the other hand, the screen may comprise a spherically curved surface all points of this surface being substantially equidistant from the light deflecting medium. When the image projected on such a curved surface is viewed from a point at or near the center of curvature, the objects will assume their true and undistorted relationship.

For purposes of clarity the method will be more specifically described in connection with the accompanying drawings by first describing the various methods of making the photographic recordings and then by describing the methods of projecting the recorded images. It will be understood, however, that in producing the environmental effect above mentioned without distortion the method of taking and the method of projecting pictures bear an intimate relationship and in reality together constitute a single method of procedure.

In Figs. 1 to 9 of the drawings are shown various types of reflecting surfaces adapted to produce the desired recorded images on photographic plates or films. In Fig. 1, for example, the reflector 15 is of hemispherical contour and is axially arranged with respect to the lens 16 of a suitable camera 17 and spaced from the camera at such a distance that the sensitized plate or film 18 in the camera will record the entire reflector and the image reflected therefrom. The recording would be circular in form as is diagrammatically indicated at 19 in Fig. 2 of the drawings. The corner and edge portions 20 of the film 18 are not desired in the subsequent projection of the picture and may be masked or blacked out by any suitable means. For that matter, a film or plate of special shape may be employed to record only the desired portion of the image.

The image 19 recorded on the plate or film 18 will include substantially the entire surroundings of the reflector or theoretically all the surroundings except those eclipsed from the camera by the reflector itself. By way of illustration, the dot and dash lines 21, 22, 23 and 24 represent the paths of reflected light rays from various points about the reflector 15 to the film 18. For purposes of clarity, the reflected rays in Fig. 1 have been shown in two dimensions only. It will be understood, however, that in a three dimensional showing similar rays could be drawn throughout the entire circle of revolution about the axis 25 of the reflector and camera.

In Fig. 3 of the drawings, there is shown a modified form of reflector 15a comprising a quadrant of a sphere or substantially half of the hemispherical reflector 15 in Fig. 1. The virtual image in the reflector 15a is focused through the lens 16a of the camera 17a upon the photographic plate or film 18a producing the distorted image 19a diagrammatically indicated in Fig. 4. When using a reflector of this type substantially half of the surroundings of the reflector will be recorded. The camera has been indicated as spaced transversely from the axis 25a of the reflector 15a and alined parallel to said axis. The reflected rays 21a, 22a, 23a are merely representative of paths of reflection from various points about the reflector 15a. It will be apparent that the camera 17a may be alined with the reflector 15a in other ways to produce particular effects. For example, the camera may be arranged in alinement with and directed along the axis 25a of the reflector, or on the other hand, the camera may be arranged in alinement with but tilted at an angle to the axis 25a. In each case, the contour and distortion of the reflected image will be distinct, and the particular arrangement of the camera and reflector will, therefore, depend upon the type of image that is desired from time to time.

It will, of course, be apparent with the method and apparatus described in connection with Figs. 1 to 3, as well as those hereinafter described, that the camera and reflector may be arranged in any desired position with respect to the surroundings to insure complete recording of some particular portion of the surroundings. For example, the camera and reflector may be arranged vertically with the reflector either above or below the camera or on the other hand they may be arranged horizontally and pointed in any desired direction. The particular arrangement in any event will depend upon the result which is desired by the photographer.

In Fig. 5 there is shown a further adaptation of a method of recording environmental images, and particularly for recording images including only a predetermined section or portion of the surroundings. In taking pictures according to this method only a small area 26 of a spherically or otherwise curved reflector 15b is effective in reflecting the image desired. In determining the size and shape of the effective area, a screen or shield 27 may be employed adjacent the reflector 15b and substantially parallel to the axis of rotation 25b thereof. The shield 27 is provided with an aperture 28 of rectangular or other predetermined shape, and it will be apparent that the rays 29 representing the limiting paths of light recorded on the film or plate 18b in the camera 17b will define an irregular distorted image diagrammatically shown at 19b in Fig. 7. The shape of the effective area 26 of the reflector is shown in approximation in Fig. 6 of the drawings, it being apparent that the shape depends upon the shape of the aperture 28 in the screen 27. In this connection, it should be understood that the desired result may be as effectively attained by omitting the screen 27 and employing as a reflector a small portion having a shape and contour defined by the area 26 as shown in the drawings.

In Fig. 8 of the drawings, there is shown a reflector 30 and a camera 31 arranged one with respect to the other in substantially the manner described in connection with Fig. 1. The reflector 30, however, has been shown as a parabolic reflector in contrast to the hemispherical reflector 15 shown in Fig. 1. For purposes of clarity the end curvature of the reflector 30 has been shown substantially equal to the spherical curvature of the reflector 15; and a number of representative paths of reflection 32, 33, 34, 35 and 36 have been indicated. The paths of reflection in Fig. 8 as well as in Fig. 1 have been shown as contacting substantially equidistant points on the reflecting surfaces, and it will be apparent that in using a parabolic reflector a greater amount of light is reflected at the wide angles than is the case with the hemispherical reflector. This is clearly brought out in the drawings by comparing the effective areas of the reflectors in reflecting rays from substantially equal angles as defined by the paths 21, 23 in Fig. 1 and the paths 32, 35 in Fig. 8. These angels are of course mere approximations but the showing serves to clearly indicate that a much greater reflecting surface is effective in this range when a parabolic reflector is employed. It will, therefore, be apparent that in many instances it may be more desirable to employ a parabolic reflector to insure more accurate recording of the wider angles of the surroundings.

In each of the showings in Figs. 1, 3 and 8, the resulting photographic image would of course include the camera itself, and in many instances this will be unnecessary or even undesirable. To prevent the recording image of the camera of the photographic image, the end of the reflector may be removed or blacked out by suitable means, but with such an arrangement, it will be apparent that the central portion of the photographic image will still be wasted. In Fig. 9, there is shown an arrangement of a special reflector 37 and a camera 38 which is intended to obviate this difficulty. The reflector 37 is basically conical in contour, in other words, it comprises a surface defined by a line 39 arranged angularly to and terminating at a point 40 on the axis 41 of the camera and carried through a circle of revolution about said axis. The line 37 may be straight or may have a circular, parabolic or other desired curvature to provide for the reflection of the surroundings through a predetermined angle, such for example, as the angle defined by the limiting reflected rays 42, 43 as seen in Fig. 9. Furthermore, the reflector may be shaped to produce a record of any portion of the surroundings such for example as a portion entirely below the reflector or a portion entirely above the reflector depending upon the particular requirements to be met in the subsequent projection of the recorded image. The reflector of Fig. 9 is probably best referred to as a reflector of modified conical curvature.

In each of the varied methods of recording distorted images as above described, it will be apparent that the size and shape of the reflector must be considered in terms of the effective scope and angle of the camera as well as the distance from the camera to the reflector. When, as in most instances, the camera is arranged fairly close to the reflector, a special lens should be employed to properly focus the virtual image in the reflector.

The pictures recorded in the various ways above described may be used directly by projection onto a flat screen to produce intended distorted effects and so used for decorative, artistic or scientific purposes. It is primarily intended, however, that the pictures be projected through the same or a structurally similar reflector onto a screen of predetermined shape and contour so as to produce a projected image having the natural proportions of the surroundings originally photographed. It is important, however, to note that the reflector used in projecting the pictures bear the proper relationship to the reflector used in taking the pictures in order to prevent distortion of the projected image. By way of example, if a hemispherical reflector having a radius of curvature X was arranged a distance Y from the camera in taking the picture the same reflector arranged the same distance from the projector should produce a true projected image. Or on the other hand, a reflector having a radius of curvature 2X and arranged a distance 2Y from the projector should produce an equally true projected image. It will be apparent, in this connection, that the conventional projector might have to be altered in some respect in order to provide an angle of projection equal to the scope or angle of the camera used in originally taking the picture, in order that the projected rays contact the surface of the reflector at the proper angle.

This modification could, of course, be made in the camera, as for example, by using a telephoto or magnifying lens which would reduce the scope or angle included in the recorded image to more nearly the normal angular projection of the conventional projection machines. When using a telephoto lens as above described in taking the picture, it will, of course, be apparent that the reflector may be arranged at a much greater distance from the camera and subsequently in projecting the picture the reflector may be arranged further from the camera. The particular structure of the camera and projector may be varied to produce the desired result in the most practical way, the important feature being that the optical arrangement used in projecting the picture is the same as or proportional to the optical arrangement used in taking the picture.

In Figs. 10 to 13, I have diagrammatically shown various modifications that may be employed in the method of projecting the pictures recorded in the manner previously described. In Fig. 10 for example, there is shown an arrangement adapted for projecting a picture onto a spherical screen 44 through the means of a projector 45 and a reflector 46 shown in a cutaway portion on the screen 44. The reflector 46 may be of spherical, parabolic, or other predetermined curvature similar to the curvature of the reflector used in recording the picture. The projection may be directly upon the reflector 46 or to conserve space it may be first reflected by a mirror 47 arranged at a suitable angle. Representative paths of projection are indicated at 48, 48a, and it will be apparent that the scene projected will cover the entire spherical surface from the projecting aperture 49 at one side of the sphere to that portion of the opposed side of the sphere which is eclipsed by the reflector 46.

The arrangement shown in Fig. 10 may be of any desired size, for example, the screen 44 may be relatively small and translucent adapting the same to be viewed from the outside. Such an application might be used for example in illuminating a globe for ornamental and educational purposes. On the other hand, the screen 44 may be very large and adapted to be viewed from the inside. In such an adaptation it is of course not essential that the screen 44 be a complete sphere but may be open at the lower portion 50 thereof to provide access to a suitable viewing area below the reflector 46. It should be noted, in this connection, that the projected image will be more natural and will have the least distortion when viewed from a point closely adjacent the reflector 46. However, the projection will be reasonably accurate throughout a relatively wide area in the vicinity of the reflector 46 and of course the larger the reflector and screen, the larger will be the area for viewing a true projected image.

In Fig. 11, there is diagrammatically shown an arrangement for projecting a picture from a projector 51 through a suitably curved reflector 52 onto a substantially hemispherical screen 53. The reflector 52 is arranged substantially at the center of curvature of the screen 53, and it will be apparent that the picture may be projected from any angle circumferentially of the screen by arranging the reflector 52 at a corresponding angle with respect to the projector. A projected image is most favorably viewed from a point closely adjacent the reflector 52. However, depending upon the size of the screen and reflector the area of effective vision may be extended. The arrangement shown in Fig. 11 is especially suited for use in novelty window displays and for exhibition purposes where the projected image can be viewed by individuals and small groups of people.

In Fig. 12, there is diagrammatically shown one way of applying the improved projection method in the projection of pictures in rooms, halls and theatres. The picture taken for projection with this type of an arrangement would preferably be the type recorded in the manner shown in Fig. 5 of the drawings, or in other words the image reflected from a small area of a spherically or otherwise curved surface is employed. In projecting such a picture a curved reflector 54 similar to the reflector used in recording the image is arranged centrally of the viewing hall or theatre 55 having a curved screen 56 at one end thereof and a projecting room 57 arranged in one peripheral wall of the room.

By way of example, Fig. 12 may be considered a plan view of a theatre, 58 representing a balcony. A projection room 57 is arranged in alinement with the balcony so as to project through a hollow portion 59 of the balcony onto the reflector 54 arranged in a recess 60 clearly shown in the cut-away portion of the balcony. Such an arrangement would entirely separate the audience from the projecting mechanism, and at the same time would provide for the arrangement of the reflector 54 in a position so that the greatest number of people would be within the scope of relatively true and accurate projection. It will be apparent that the reflector 54 would preferably be a small section of a relatively large diameter sphere, while the spherically curved screen would be a center of curvature at or near the reflector 54. With a reflector of other curvature, it might be more practical to employ a special curvature in the screen 56 in order to produce more accurate projection.

In projecting a limited image as shown in Fig. 12, it will be apparent that the environmental effect produced will not be as pronounced as in the projecting arrangements shown in Figs. 10 and 11. The environmental effect, however, will be greatly improved as compared with the conventional flat projection.

In Fig. 13 there is shown a still further adaptation of the improved projection method especially suited for room illumination. The projector 61 is arranged outwardly of a room 62 having an aperture 63 in the ceiling thereof. A reflector 64 is arranged directly below the aperture 63, the reflector being preferably of hemispherical or parabolic curvature. This system may be used for projecting photographic images to illuminate predetermined portions only of a room or on the other hand, to produce on the bare walls of a room reproductions or images of pictures, hangings and the like previously photographed on the walls of the same or similarly shaped room. The projection may be effected directly upon the reflector 64 or by interposing a plane mirror 65 between the projector and reflector as indicated in the drawings. It will be apparent, however, that in such a system allowance would have to be made for the reversal brought about by the reflector or mirror 65. It will be apparent that the projecting system as shown in Fig. 13 may have definite application in certain types of theatrical illumination, especially in providing slight variations and changes in the sets for various types of stage shows. As a further possibility in adapting the projecting system to room illumination, it will be apparent that predetermined portions only of the reflector 64 may act as reflecting surfaces adapted to project images within preformed frames on the walls of the room forming decorative panels for the room. Furthermore, the reflector 64 may have an aperture of predetermined shape in the end thereof adapted to allow a beam of projected light to fall upon predetermined areas, such for example as a table arranged in the center of the room.

In all of the variations in the improved method and apparatus for taking and projecting environmental pictures, it will be understood that either still or moving pictures may be employed and either black and white or colored film used in order to produce the particular result desired. The actual projection of images through the medium of curved reflectors entails the use of unusually strong sources of light. Special cooling means would in most instances be necessary to prevent destruction of the plate or film when subjected to the light of increased strength, and from this standpoint in projecting environmental pictures on large curved screens it would be preferable to use a motion picture projection system since the time of exposure to the heat and light during projection would be sufficiently short to minimize the danger of destroying the film.

It will be understood that while essentially the invention relates to the reproduction of an environment, by taking and subsequently projecting pictures with the apparatus and in accordance with the method described, there are instances where the method and apparatus for taking and for projecting pictures may be utilized separately to produce unusual or distorted effects. In other words, the invention also involves a method and apparatus for taking distorted pictures for any desired ultimate use, and also a method and apparatus for projecting images in a manner to alter the same while in projection in producing unusual and novel effects. In this connection, it will be understood that a film, plate or other recording of a photographic image made in accordance with any of the methods set forth also constitutes an element of the invention. It will further be apparent that it may be possible to record a distorted image and project the same to produce an environmental effect by using a lens of the extremely wide angle type in place of the convex reflectors herein described. It is believed that reflectors are more readily adaptable for use in the novel procedure described herein, but it will be understood that it is within the scope of the invention to employ any combination of light deflecting media in taking and projecting pictures to produce the desired effect.

In adapting the method of taking and projecting pictures to special uses, it will be apparent that a reflector having a predetermined irregular surface contour may be employed. In order to facilitate accurate reproduction when using such a reflector, however, it is important that the surroundings photographed and the screen used in projection bear the same relationship to the reflector employed. Such a method would be particularly adapted for reproducing charts and designs on flat surfaces, and it will be apparent that since reflectors having exactly corresponding irregularities must be used in taking and projecting the picture, the method would be valuable in safeguarding secret plans and the like. The distorted photographic images would be illegible until projected through the medium of the proper reflector.

Having fully described my invention, what I claim as new and desire to secure by Letters Patent, is:

1. The method of photographically reproducing an environment which comprises interposing between a camera and a setting to be reproduced, a convex parabolic reflector having the area of greatest curvature extending toward said camera and adapted to form a distorted image of a wide angle of the surroundings in all directions about a selected point in said setting, adjusting said reflector with respect to said camera to properly position the distorted image with respect to a sensitized element therein, recording said image on the element and developing the same for projection, and then projecting said image through a structurally similar reflector onto a screen of spherical curvature, the reflector employed in projection being substantially at the center of curvature of said screen whereby the image on said screen when viewed from a point near the center of curvature is an accurate and undistorted reproduction of the surroundings photographed.

2. The method of photographically reproducing an environment which comprises interposing between a camera and a setting to be reproduced, a convex parabolic reflector having the area of greatest curvature extending toward said camera and adapted to form a distorted image of a wide angle of the surroundings in all directions about a selected point in said setting, adjusting said reflector with respect to said camera to properly position the distorted image with respect to a sensitized element therein, recording said image on the element and developing the same for projection, and then projecting said image through a structurally similar reflector onto a screen of a contour structurally similar to that of the setting photographed the last named reflector and screen being oriented in the same manner as the reflector and setting in recording the image, whereby the projected image on said screen is an accurate, undistorted reproduction of the setting photographed.

3. The method of characterizing inner walls of a room which comprises first photographing characterized surfaces of a setting structurally similar to said room through the medium of a convex parabolic reflector interposed between said setting and a camera, with the area of greatest curvature on said reflector extending toward said camera and then projecting the photograph thus formed onto a structurally similar reflector adjusted with respect to said room and projector in synchronism with the adjustment in making the photograph, whereby the projected image is distributed to the walls of the room to exactly reproduce the characterizations of the structurally similar setting photographed.

4. A projector camera device and optical system therefor, comprising a lens, a convex parabolic reflector adjustably arranged in alinement with and in spaced relation to said lens, and said reflector being adapted to reflect rays throughout a range defined substantially by a hemisphere, having its center of curvature at said reflector and its base in the plane of said lens and reflector.

5. A projector camera device and optical system therefor, comprising a lens, a convex parabolic reflector adjustably arranged in alinement with and in spaced relation to said lens, said reflector being adapted to reflect rays throughout a range defined substantially by a hemisphere, having its center of curvature at said reflector and its base in the plane of said lens and reflector, and a projection screen comprising a large spherically curved surface arranged and oriented to perpendicularly interrupt rays reflected from said reflector throughout said range thereof.

6. A projector camera device and optical system therefor, comprising a lens, a convex parabolic reflector adjustably arranged in alinement with and in spaced relation to said lens, and a projection screen comprising a large hemisphere arranged with the center of curvature thereof at said reflector and the base thereof in the plane of said lens and reflector.

7. A projector camera device, comprising a camera, a convex parabolic reflector, from which a wide angle image is photographed by said camera onto a sensitized film, said reflector being arranged with the area of greater curvature facing the camera lens, the axis of the lens being arranged at an acute angle with the axis of the parabolic curvature of the reflector, a similar lens system for projecting said photographic image onto a convex parabolic reflector, and a convex hemispherical screen onto which the image is reflected from said last mentioned reflector.

8. A projector camera device and optical system therefor, comprising a lens, a convex reflector adjustably arranged in alinement with and in spaced relation to said lens, said reflector being adapted to reflect rays throughout a range defined substantially by a hemisphere, having its center of curvature at said reflector and its base in the plane of said lens and reflector, said convex reflector comprising a parabolic surface with the area of greatest curvature extending toward said lens, and the axis of said reflector being parallel to and offset with respect to the axis of said lens.

9. A projector camera device and optical system therefor, comprising a lens, a convex reflector adjustably arranged in alinement with and in spaced relation to said lens, said reflector being adapted to reflect rays throughout a range defined substantially by a hemisphere, having its center of curvature at said reflector and its base in the plane of said lens and reflector, said reflector having a convex surface defined by a line passing through the axis of said lens comprising a portion of a parabola having its axis parallel to the axis of said lens, and said line being revolved about the axis of said lens.

JAMES S. CONANT.